United States Patent
Colgate et al.

(10) Patent No.: US 10,705,610 B2
(45) Date of Patent: Jul. 7, 2020

(54) APPARATUS FOR UNIFIED AUDIO TACTILE FEEDBACK

(71) Applicants: James E. Colgate, Evanston, IL (US); Michael A. Peshkin, Evanston, IL (US); Craig Shultz, Chicago, IL (US)

(72) Inventors: James E. Colgate, Evanston, IL (US); Michael A. Peshkin, Evanston, IL (US); Craig Shultz, Chicago, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 283 days.

(21) Appl. No.: 15/186,056

(22) Filed: Jun. 17, 2016

(65) Prior Publication Data
US 2016/0370862 A1    Dec. 22, 2016

Related U.S. Application Data

(60) Provisional application No. 62/181,863, filed on Jun. 19, 2015.

(51) Int. Cl.
*G06F 3/01* (2006.01)
*G06F 3/043* (2006.01)
(Continued)

(52) U.S. Cl.
CPC ............ *G06F 3/016* (2013.01); *G06F 3/041* (2013.01); *G06F 3/043* (2013.01); *G06F 3/044* (2013.01); *G06F 3/16* (2013.01)

(58) Field of Classification Search
CPC .......... G06F 3/016; G06F 3/041; G06F 3/043; G06F 3/044; G06F 3/16
See application file for complete search history.

(56) References Cited

U.S. PATENT DOCUMENTS

| | | |
|---|---|---|
| 2009/0079550 A1 | 3/2009 | Makinen et al. |
| 2010/0141408 A1* | 6/2010 | Doy .................. G06F 3/016 340/407.2 |

(Continued)

FOREIGN PATENT DOCUMENTS

WO    2013156815 A1    10/2012

OTHER PUBLICATIONS

International Preliminary Report on Patentability and Written Opinion issued in connection with PCT/US2016/038183 dated Dec. 28, 2017; 13 pgs.

(Continued)

*Primary Examiner* — William Boddie
*Assistant Examiner* — Saifeldin E Elnafia
(74) *Attorney, Agent, or Firm* — Vedder Price P.C.

(57) ABSTRACT

A touch interface device that produces tactile and audio output comprising a touch surface, an first electrode coupled to the touch surface that receives a first haptic/audio output potential, a second electrode coupled to a low impedance return path to the device, the first and second electrodes being configured such that when both the first and second electrodes are touched by an appendage of a user, a current flows between the first and second electrodes and the appendage, where the current creates an electric field that imparts a controlled electrostatic force at interfaces of the first electrode and the appendage, and wherein the electrostatic force provides tactile feedback to the appendage of the user and causes vibration in the surrounding air that is audible to the user.

24 Claims, 6 Drawing Sheets

(51) Int. Cl.
  *G06F 3/041* (2006.01)
  *G06F 3/044* (2006.01)
  *G06F 3/16* (2006.01)

(56) References Cited

U.S. PATENT DOCUMENTS

| | | |
|---|---|---|
| 2012/0013220 A1 | 1/2012 | Kawata et al. |
| 2012/0287068 A1 | 11/2012 | Colgate et al. |
| 2013/0307789 A1 | 11/2013 | Karamath et al. |
| 2015/0234464 A1* | 8/2015 | Yliaho .................... G06F 3/048 345/473 |

OTHER PUBLICATIONS

International Search Report and Written Opinion filed in PCT/US2016/038183 dated Sep. 13, 2016; 14 pgs.

* cited by examiner

APPARATUS FOR UNIFIED AUDIO TACTILE FEEDBACK

RELATED APPLICATIONS

This application claims priority to U.S. Provisional Application No. 62/181,863, titled "Apparatus for Unified Audio Tactile Feedback," filed on Jun. 19, 2015.

CONTRACTUAL ORIGIN OF THE INVENTION

This invention was made with government support under grant number IIS-1302422 awarded by the National Science Foundation. The government has certain rights in the invention.

BACKGROUND

The present disclosure generally relates to touch interface devices and more particularly to apparatus and methods of rendering both tactile feedback and audible sound via an appendage, such as a finger, sliding along a controlled touch surface.

In the modern electronic world the senses have been broken up into separate channels from each other. Devices have dedicated hardware for each piece of the sensory feedback experience, and it is only through careful synchronization and design that unified sensory experiences are presented to the user. Take, for example, receiving a call on a smartphone. First, an audio speaker rings, then, the visual display lights up and presents visual information identifying the caller. Once connected, the microphone records sound, while the speaker starts playing back audio from the person on the other end. If it is a video call, then the camera also starts recording and playing back video from the other person as well. What seems like a routine, almost intuitive event to the user is actually a complicated electronic series of signals and events.

There is a natural inclination to take notice of things buzzing or making sound, as when the phone starts ringing. Users of cellular technology are naturally inclined to gather complex information from reading a visual display, such as when the caller's information is presented on screen. Users know that touching something directly should produce an action on it, as when answering the call. Also, users naturally know how to carry on a conversation with someone they can both hear and see, such as when talking over a video call. Each of these actions are routines that users commonly encounter in the world.

The synchronized audio-visual paradigm has come to dominate electronic media for nearly a century. In its basic form, a visual display (such as a table, television, computer monitor, or movie screen) is synchronized in time with dedicated audio reproduction (anything from a single speaker to 5.1 surround sound or even more). This combined audio-visual paradigm has been so successful in reproducing realistic and informative experiences that most users would hardly give the technical details a second thought. Users simply get lost in a TV show or movie, and accept the audio-visual feedback as a temporary reality. While typically a passive interaction, it can easily be made more interactive. Take, for example, video games, which render real-time graphics and audio in response to user input. With only limited input, such as pressing a few buttons on a controller, the entire experience becomes much more immersive than simply watching and listening to a movie. Indeed, many videogames attempt to push the realism factor even further, and include basic forms of tactile feedback.

While this audio-visual paradigm is dominant for sensory output devices, current technology does not provide for an analogous tactile-audio paradigm or a tactile-audio-visual paradigm, that is, a system which can synchronously produce tactile vibrations and audible sound originating and emanating from the exact physical location of a user's fingertip on a surface Therefore, a need exists for a system that will allow users to experience tactile and audio feedback simultaneously.

BRIEF SUMMARY OF THE INVENTION

The present disclosure seeks to overcome such disadvantages in the prior art. The present disclosure involves an extension of variable friction tactile feedback, however, that significantly expands this actuation method to incorporate high frequency audio feedback generated via an appendage sliding along a controlled touch surface. This disclosure turns the sliding interaction between a controlled surface and human skin on an appendage into a high bandwidth, high force, unified audio-tactile transducer. A user is able to both feel and hear forces and vibrations emanating from the user's appendage, such as a fingertip, as it is drawn across a surface. Both the sound and tactile sensation itself originate from induced vibrations between the skin/surface interface. Because of this fact, the sensations are inherently localized to individual fingers or other areas of user contact with the touch surface. With this new programmable ability, interface designers can create expressive and more realistic multimodal interactions that have a distinctive feel and sound.

One embodiment of the present disclosure includes a touch interface device that produces tactile and audio output comprising a touch surface, a first electrode coupled to the touch surface and that receives a first haptic/audio output potential, a second electrode coupled to the touch surface and that receives a different second haptic/audio output potential than the first haptic/audio output potential, the first and second electrodes being configured such that when both the first and second electrodes are touched by an appendage of a user, a current flows between the first and second electrodes and the appendage, wherein the current creates an electric field which imparts a controlled electrostatic force at interfaces of each electrode and the appendage and wherein the electrostatic force provides tactile feedback to the appendage of the user and causes vibration in which couples to the surrounding air and is audible to the user.

In another embodiment, at least one of the first and second electrodes is coated by an electrically semi-conductive layer or insulating layer.

In another embodiment, the first and second electrodes are coated by an electrically semi-conductive layer or insulating layer.

In another embodiment, a controlling potential is applied to the first electrode, and the second electrode is held at a constant potential or ground potential.

In another embodiment, a controlling potential is applied to the first electrode, and a different controlling potential is applied to the second electrode.

In another embodiment, a controlled electrostatic force is created at the interface of both the first and second electrodes.

In another embodiment, a controlling potential is applied to the first electrode, and the second electrode is provided by the body's capacitive coupling to the return path.

In another embodiment, the first and second electrodes are attached to an acoustically resonant surface.

In another embodiment, an air gap may be formed between the appendage and the touch surface.

In another embodiment, the amount of force applied to the appendage is related to the voltage across the air gap.

In another embodiment, the first haptic/audio signal and second haptic audio signals are bipolar controlling signals.

In another embodiment, the potential difference between the first electrodes and second electrodes is actuated at frequencies ranging from 0 Hz to 20 kHz or more.

Another embodiment of the present disclosure includes a method for controlling a unified tactile and audio output from a touch interface device comprising combining both haptic and audio content into a single bipolar controlling signal, applying a DC bias force creating element to the combined signal and feeding the combined signal to one or more electrodes coupled to a touch surface of the touch interface device.

Another embodiment includes controlling an output potential difference of the electrodes according to the combined signal.

Another embodiment includes monitoring current flowing between the electrodes and controlling an output potential difference of the electrodes according to the current flow, and further controlling the current flow according to the combined signal.

Another embodiment includes utilizing electrical controlling elements that control the potential difference between the electrodes or current flowing between the electrodes at frequencies ranging from 0 Hz to 20 kHz or more.

Another embodiment includes creating an additional normal force by energizing the edges of an air gap formed by the touch surface and an appendage engaging the touch surface.

In another embodiment, movement of an appendage coupled to the touch surface generates a plurality of high frequency lateral vibrations that generate an audible sound.

In another embodiment, a DC bias force creating element is applied to the combined haptic and audio signal.

In another embodiment, static and low frequency changes in the combined signal generate a haptic effect.

In another embodiment, the combined signal is amplified and conditioned.

BRIEF DESCRIPTION OF THE DRAWINGS

In describing the preferred embodiments, reference is made to the accompanying drawing figures wherein like parts have like reference numerals, and wherein.

It should be understood that the drawings are not to scale. While some details of a touchscreen device, including details of fastening means and other plan and section views of the particular components, have not been included, such details are considered to be within the comprehension of those of skill in the art in light of the present disclosure. It also should be understood that the present invention is not limited to the example embodiments illustrated.

DETAILED DESCRIPTION

Modern touchscreen devices have begun to incorporate additional tactile and audio feedback to supplement the visual feedback from the direct-touch interaction. Pressing a virtual button elicits an audible click and vibration from the device. Scrolling down a page corresponds to a series of click sounds and vibration ticks, evoking physical detents being scrolled over. The screen unlocks with a swipe, an unlatch sound, and vibration.

The audio in these interactions is typically produced through one or more speakers attached to the device. These speakers playback a single (mono) or dual (stereo) channels to the user. Due to limited extra space on the front of these touchscreen devices (since most of the front is taken up by the touchscreen itself), speakers are located on the edges, back, or some other secondary location on the device. On mobile devices, these speakers are typically limited in size and power, and are therefore limited in frequency range and volume of sound they can produce. This is one reason why, many times, headphones, earbuds, or an external set of speakers are used when users wish to enhance their listening experience.

Haptic (tactile) feedback used in these touchscreen devices is typically a vibration based vibro-tactile effect, similar to that which is produced by the eccentric rotating mass (ERM) motors found in many of the early electronic pager devices and the previously mentioned gaming controllers. These motors have a limited frequency range over which they can operate, and provide feedback by simply shaking or rumbling the entire device. Techniques have been used in recent years to expand some of the capabilities of these devices, such as using linear resonant actuators (LRA) or electroactive polymers (EAP). However, all of these technologies still rely on fundamentally the same operating principle, vibrating the entire structure to which they are attached. Much like the audio feedback coming from the speakers, the vibro-tactile feedback is presented globally to the device.

More recently, other devices used for tactile feedback operate in a different manner, not by vibrating the entire device, but by inducing vibrations in the skin of the user itself through variable friction technology. This is can be accomplished with mechanical vibrations, or by oscillating electric fields. The former has the drawbacks of requiring high power consumption and limited ability for separate multi-touch experiences. This is because the entire surface is excited mechanically via piezoelectric actuators, so multiple fingertips touching the surface will all feel the same effect. In the case of oscillating electric fields, the effect can be located in space for different fingers (multi-touch) and can be combined with touch sensing to provide both touch input and output. In each of these cases, however, the bandwidth of the force produced on the finger typically is limited to the tactile range, generally below 1 kHz. Some reasons for this limitation involve the system dynamics and precise control of the devices. In the case of mechanically vibrating surfaces, it is difficult to achieve wide bandwidths of actuation due to system resonances, which inherently are narrow in bandwidth. In the case of oscillating electric fields, the complex impedance of the skin and other system parameters, such as parasitic capacitance, can complicate control methods, and limit the amount of force that can be produced in the higher frequency ranges.

Figure 1:
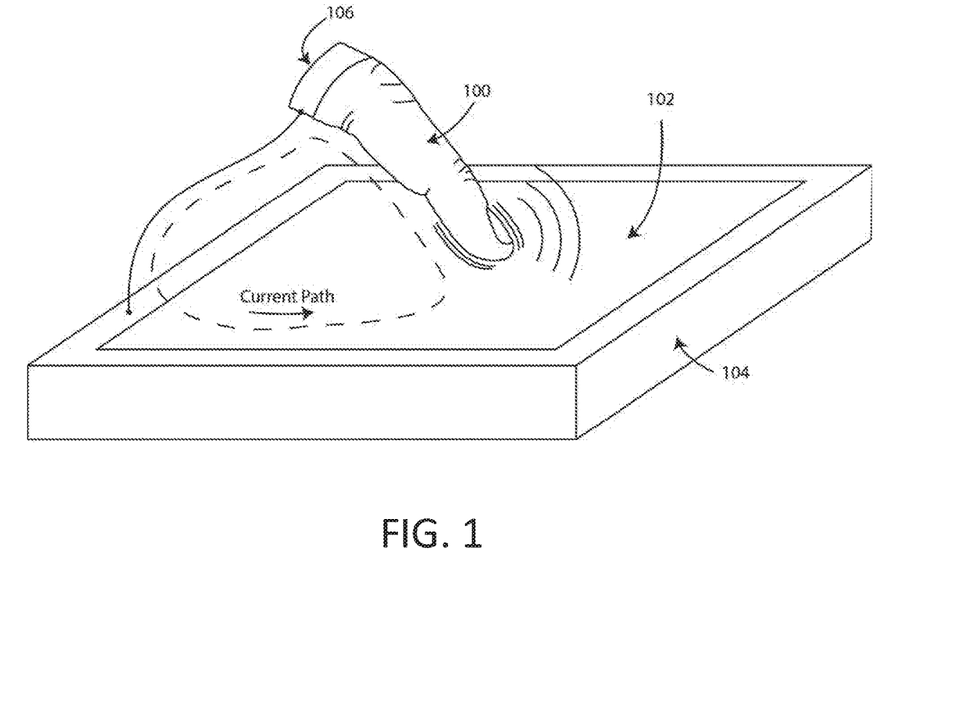
FIG. 1 depicts a finger engaging a touch surface on a device and an electrical current path used to create an audio/tactile feedback.

FIG. 1 depicts a finger engaging a touch surface on a device. As the finger 100 engages the touch surface 102 on the device 104, the device 104 causes current to flow between the touch surface 102, and return path electrode 106. This current causes an electrostatic force to be generated at the interface between the finger 100 and touch surface 102. Both audio and tactile feedback is generated at the skin to surface (skin/surface) interface itself, and therefore is highly localized to each finger 100 touching the touch surface 102. In this sense, the effect can be multi-touch, where each appendage touching the touch surface 102 generates a separate sound and tactile effect.

In order to produce and control such large forces on the finger 100, the device 104 must have a large dynamic range. In addition, the device 104 must be able to provide a large DC offset bias force to the finger 100, or inherent signal distortion will occur. This DC offset biases the finger 100 during lateral movement, and allows a bipolar force signal to be faithfully reproduced. Without this DC bias, inherent frequency doubling distortion would occur in the transduction from electrical to the mechanical energy. This is because the device cannot repel the finger 100, it can only attract it, and thus it must bias this attraction in order to be able to lessen or strengthen the attraction according to the bipolar signal.

This need for a DC bias force is one reason why previous attempts at producing controllable audio have been lacking in both fidelity and volume of sound. Indeed, the amount of force and the complex control of such force in prior art tends to lead to faint buzzing sounds being present when the devices are operating. The low volume buzzing sound has, in the past, been perceived as an annoyance. However, the present disclosure presents apparatus and methods of advantageously taking this annoyance and turning it into a powerful and practical high-bandwidth audio source. The sound produced from this interaction can be heard by the user and anyone in the immediate area, while the static forces and low frequency vibrations can be felt directly by the user.

Similar to audio-visual media and visual-tactile touchscreens, an audio-tactile feedback device combines two separate senses in a natural and intuitive manner. It provides a distinct experience, separate from regular audio listening. In addition to playing the song back, because the movement of the user's finger 100 actually is controlling (and even powering) the audio-tactile feedback, the user is able to modulate the volume and start and stop the audio naturally through the user's movement of the finger 100 on the touch surface. This effect in itself could be used to create an entirely new range of electronic instruments where a musician, much like running a bow along the strings of a violin, could run a finger across multiple surfaces, each actuated with a different tone, to produce a piece of music.

Figure 2:
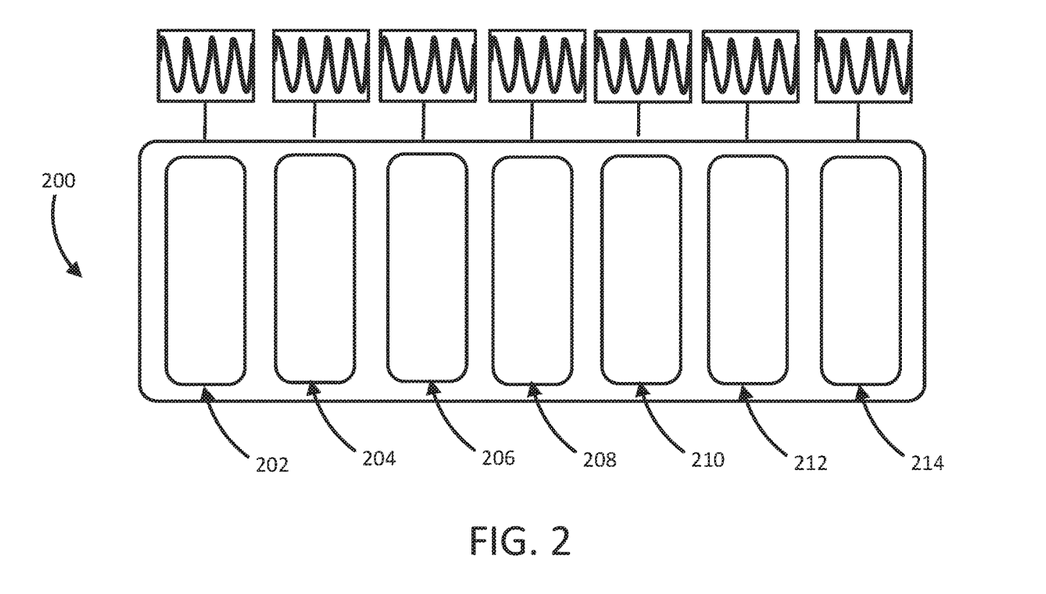
FIG. 2 depicts a panel having seven different surfaces that are associated with seven different musical notes.

FIG. 2 depicts a panel 200 having seven different surfaces that are associated with seven different musical notes 202, 204, 206, 208, 210, 212 and 214. A user can play each note simply by running a finger across each respective surface. In this example, the notes could take on a programmable instrument character. They could sound like a violin, guitar, flute, or something else completely synthesized. In fact, the surfaces could additionally be attached to their own resonant bodies to mechanically add different acoustic properties.

While many of the effects mentioned above can use finger position sensing to drive their rendering, other inputs could be used instead of, or in conjunction with position sensing and its derivatives. Various electrical or mechanical quantities such as finger contact patch area, electrical system impedance, applied normal force, skin stick-slip condition, or more could be either measured directly or inferred from a system model, and then fed back into the audio/tactile input. This could lead to more naturalistic texture rendering or, more generally, better rendering methods for all of the mentioned applications.

Figure 3:
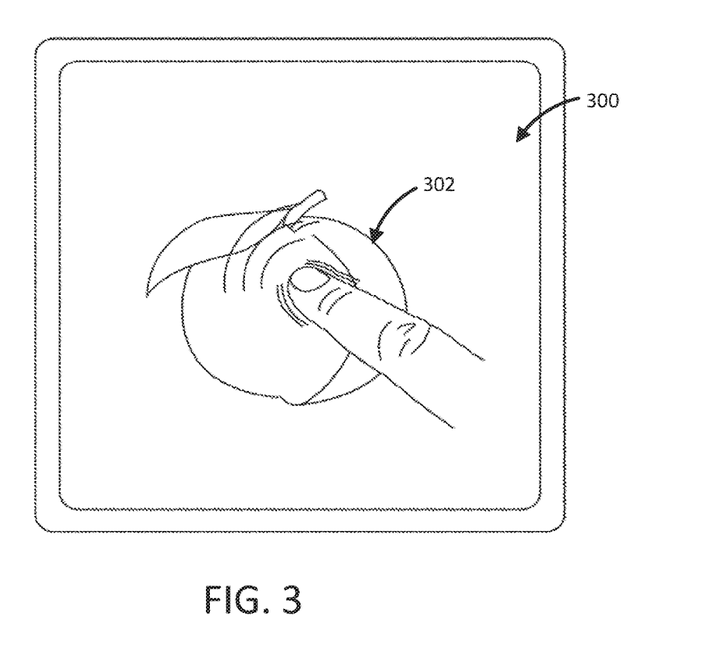
FIG. 3 depicts an image of a peach displayed on a touch surface.

In another embodiment, the device is transparent via a transparent device layers. This would allow a visual screen to be incorporated as well, which could be used to display any number of things. FIG. 3 depicts a virtual image of a peach displayed on a touch surface. As a user drags a finger across the touch surface 300, the user could feel, hear, and see the peach 302 fuzz react to the finger. In particular, the audio component of the interaction could be what lets the user know that the user is touching a peach and not something like a nectarine. The soft fuzziness of the peach could be conveyed to the user almost through audio feedback alone.

Instead of simply playing back tactile audio sounds, the screen could, in a sense, speak back to the user, and convey other audio context as the user passes a finger along the touch surface 300. Children's picture books could have alligators that physically feel like alligator skin as they are touched, and make real noises alligators make, or have a voice recording of the word alligator play as the user interacts with the image. A huge range of information could be conveyed in the audio/tactile interaction, both on the physical level and abstract informational level.

In another embodiment, the touch surface 300 may be etched or designed to include other visual information. In another embodiment, the touch surface 300 look like wood grain, and produce sound and tactile information that would be associated therewith. It could be dyed different colors, including with electroluminescent dyes which could react to the same current passing through the surface to light up in sync with the audio and tactile feedback. Other surface treatments or dyes could be applied to give the surface self-healing qualities, which ensure the device continues to operate even if it encounters minor scrapes or scuffs. This could, for instance, be achievable using naturally occurring metal oxide layers which will form on many metallic surfaces exposed to the air.

In yet another embodiment, the touch surface 300 could be shaped to be something other than a 2D flat surface as well. The touch surface 300 could be any abstract 3D shape, simply coated in a particular surface coating, or it could be something like a thin film which can change its shape dramatically. A curved car dashboard, for instance, could be made that responds to being touched and could provide tactile/audio output. Entire walls or other architectural elements could be made to have the proper surface coating, and offer tactile/audio feedback to when touched. Smartphone or tablet cases, as well as the display for the phones and tablets, could be made to be actuated with the touch surface 300.

Though the above apparatus applications mostly have mentioned only one main electrode surface, each can be made out of many different electrodes, with different patterning. This could allow the dragging material to not have to be grounded, such as in the case of an ungrounded finger running across a surface, or this could be used to create very small electrodes, smaller than the average fingerpad. An effect which would be something like rolling could be elicited by actuating a line of electrodes in time or space as a finger is dragged across them. The user would feel one part of the user's skin adhere, and this patch of skin would move around the finger as the user continues to drag the finger.

The different haptic and audio effects can be controlled by utilizing very thick outer layers where durability is concerned, or very thin layers to reduce the amount of voltage needed, or to increase the bandwidth and to control other system dynamics. The resistivity of the main insulating construction could be fine-tuned and altered to increase the magnitude of the effect, and to produce higher frequency forces, such as ultrasonic forces. Other geometric parameters, aside from thickness, could be altered. The touch surface itself could be patterned in such a way as to maximize increased friction for a given voltage. Microscopic patterning could lead to a huge change in the amount of friction gained for a small extra normal force.

While all of these applications use human skin or an appendage, such as a finger, as an intermediate moving substrate, any semi-conductive or conductive material would work. As an illustrative example, robotic manipulators could be made using this effect. Part manipulators could actuate parts traveling along a surface, and use the movement of the parts to create audio feedback identifying the parts. Parts also could be actuated along a large range of frequencies as a way of checking for defects. Additionally, different parts may have different resonant properties, which, when actuated with a broad spectrum signal, could be identified and selected.

Other adaptations may be utilized, such as moving an intermediate sheet which, in turn, would produce extra tactile and audio effect. In many instances, the substrate being adhered could simply be a thin membrane, similar to an electrostatic speaker, which gets pulled down or relaxes. As such, the entire surface could be made of electrodes, and small membrane pockets which create an array of small speakers, each of which could be individually controlled. Actuated membranes also could be used to move small wrinkles of the membrane around the surface, or create unique "keyclick" like events when pressed upon. These membranes also could be used to selectively create increased thermally conductive pathways to materials below them. For example, a membrane could be held apart from a high thermal capacity surface just below it (so that a barrier layer of air is in between the two) and then it could be rapidly brought in contact with this surface, thus to the user increasing the apparent thermal capacity of the surface.

In a further alternative, instead of the touch surface remaining still while some other finger or surface is dragged across it, the surface itself could be moved. This could allow the finger touching the surface to be actively forced, meaning an audio effect and tactile effect could be produced simply by a user touching the surface (without additional movement by the user). Using the same effect, a substrate could be rotated or otherwise moved, and robots could be used to selectively adhere to the surface in order to change their locomotion. Entire groups of robots could be placed on an actuated surface, and they could travel to a desired location with extremely high force and speed, but relatively small power consumption.

An embodiment of this invention provides an example of how a variable friction touch surface can be utilized to provide not only tactile feedback, but controllable audio feedback as well. In this embodiment, an electrically resistive layer is deposited on top of a conductive electrode layer, which carries the actuation signal. When a user touches the resistive layer of the surface with a grounded appendage, such as a fingertip, an electrostatically induced normal force provides additional adhesion of the skin to the surface of the device. This electroadhesive force acts to pull the skin of the finger down closer to the surface, and serves to increase the amount of friction between the finger and the surface. If controlled at low frequency and while a user moves a finger laterally across the surface, this effect can produce direct tactile feedback to the user. If, however, this effect is controlled at high enough force and high enough frequency, this effect can produce large enough vibrations in the skin and surface of the device such that they are coupled to the surrounding surface and air and are clearly heard as audio feedback by the user and anyone in the surrounding area. The device is therefore capable of being easily controlled at frequencies from DC up to, but not limited by, the audible range of human hearing (approximately 20 kHz). Therefore, if the actuation signal simultaneously contains both low frequency tactile and high frequency audio content, the resulting effect is simultaneous audio-tactile feedback produced by the skin of the user's appendage itself.

Figure 4:
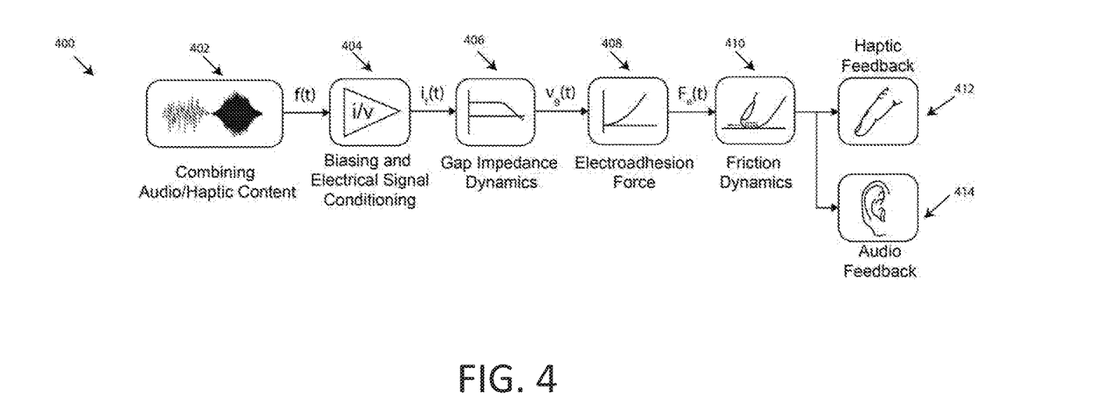
FIG. 4 depicts a schematic representation of an electromechanical system used to produce a simultaneous audio and haptic effect.

FIG. 4 depicts a representation of the entire electromechanical system used to produce a simultaneous audio and haptic effect. The system 400 includes a biasing and electrical signal conditioner 404 (amplifying and applying a DC bias element), skin/surface interface gap dynamics 406 (frequency attenuation), electroadhesive transduction 408 (electrical to mechanical actuation), and finally friction dynamics 410 (normal force to lateral force).

The manners in which this combined audio/haptic content 402 could be rendered are discussed herein. Once the output signal is created, it is passed to the apparatus in the form of a bipolar voltage signal. This is a similar type of signal that is used to carry audio to a set of speakers, except that it is able to be controlled all the way down to DC. The actuator is configured to render the audio signal down to DC. Once both the audio and tactile content are combined into a single bipolar voltage signal, they are fed into a high voltage capable biasing and electrical signal conditioning unit 402.

Figure 5:
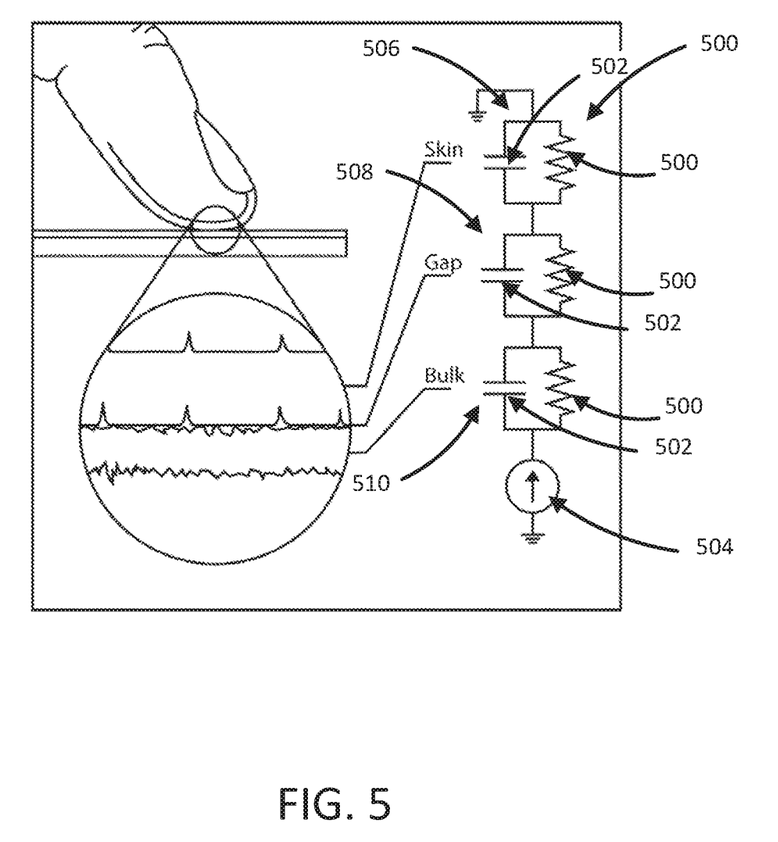
FIG. 5 depicts a schematic representation of the circuit that models the electrical dynamic system.

FIG. 5 depicts a schematic representation of the circuit that models the circuit 500. The resistors and capacitors associated with bulk material layer, air gap layer, and skin (stratum corneum) layer capture the electrical properties of each respective layer. The current source 504 shown represents the transconductance amplifier contained in the biasing and electrical signal conditioning unit. The circuit 500 is comprised of the skin layer 506, air gap 508 and bulk material layer 510. The skin layer 506 simply is the outer layer of skin that current is passed through when the finger is grounded. The air gap layer 508 represents the small gap between the outer surface of the skin and the top surface of the material the skin is being dragged across. It is composed of resistive points of contact where the skin actually touches the underlying surface, and gaps of air where the skin is a few microns above the surface. Finally, the bulk material layer 510 represents the resistance and capacitance associated with the material of which the touch surface is made. In the case of a current controlled setup, the majority of the skin 506 and bulk material layers 510 of the circuit 500 have no direct effect on the force generated on the finger. This is because the only voltage that produces an appreciable force on the finger is the force that develops across the air gap layer 508. This force can be represented by the parallel plate force equation:

$$Fe(t) = \frac{A\varepsilon_0 \varepsilon_g v_g(t)^2}{2d_g^2}$$

Where A is the total apparent area of contact, $\varepsilon_0$ is the permittivity of free space ($8.85*10^{-12}$ F/m), $\varepsilon_g$ is the permittivity of the air gap 508 (typically assumed to be close to 1 for air), $v_g(t)$ is the voltage that develops across the gap in response to $i_t(t)$, and $d_g$ is the distance across the air gap 508. The applied normal force on the finger depends on the voltage that develops across the gap, i.e., $v_g(t)$. Moreover, the effect limiting the bandwidth of force able to be produced is the bandwidth of the voltage signal we can apply to the air gap 508. In the case of current controlled setup, the voltage across the air gap 508 is the product of the total system current $I_t$, and the complex gap impedance $Z_g$:

$$V_g(j\omega) = I_t(j\omega) Z_g(j\omega)$$

For a controlled current, the gap voltage does not explicitly depend on any other system parameters, as previously mentioned. The bandwidth of the gap voltage will be determined by the bandwidth of the controlling current amplifier and the magnitude of the gap impedance. The current bandwidth of the amplifier in 404 is exceedingly high, and therefore the gap impedance magnitude will be the only term dominating the bandwidth. The air gap impedance as it evolves with frequency can be determined using the following:

$$Z_g(j\omega) = \frac{R_g}{1 + R_g C_g j\omega}$$

$$|Z_g(j\omega)| = \frac{R_g}{\sqrt{1 + R_g^2 C_g^2 \omega^2}}$$

The −3 dB rolloff frequency associated with the magnitude response is defined by the RC time constant of the gap, that is $\omega_c = 1/R_g C_g$. The gap rolloff frequencies are typically on the order of a kilohertz. Further, the rolloff for this first order system is only −20 dB/decade, and the initial forces applied to the skin within the rated bandwidth are on the order of a few newtons. There is, therefore, an actuation force on the order of hundreds of millinewtons at audible frequencies, which produces large enough changes in finger friction to elicit audible vibrations. If, in a different embodiment, a voltage source is used, the voltage across the skin and across the bulk material will diminish the total applied voltage according to an impedance divider ratio:

$$V_g(j\omega) = V_t(j\omega) \frac{Z_g(j\omega)}{Z_t(j\omega)}$$

Where $Z_g$ and $Z_t$ represent the complex air gap 508 impedance, and total complex system impedance respectively, and $V_g$ and $V_t$ represent the gap and total applied voltage. In the voltage controlled circuit, current is not directly controlled and it will eventually rise with frequency (which is the same as saying the gap impedance will fall), therefore, it may be accidentally perceived cutaneously. The main embodiment above, therefore, uses current control for its excitation.

Once the voltage develops across the air gap 508, the electroadhesion force 408 given in the original force equation governs the conversion from electrical energy to mechanical energy. Both bound and free charges at the edges of the air gap 508 are pulled by the electrical field in which they exist. This pulling is what is referred to as an additional normal force on the finger. This pulling down to the touch surface also leads to an increased real area of contact between the finger and the surface, leading to a change in friction force.

The friction force for this interaction is the normal kinetic friction. The ratio of lateral force to normal force is given by a certain linear coefficient of friction, and therefore, as the finger is sliding, a large change in normal force is linearly translated into a large change in lateral force. This lateral force can cause the bulk of the skin at the fingertip, or, indeed, the whole finger to deform and vibrate. This deformation is what triggers mechanoreceptors located in the skin, and leads to direct tactile feedback 412. This vibration of the skin also couples to the surface of the plate itself, and the rest of the skin of the finger, where it can eventually couple to the surrounding air as well. This vibration of the air around the interaction is what is heard by the ear, and perceived as audible feedback 414.

Again, because the normal force is biased, a bipolar swing in voltage can be faithfully reproduced by a bipolar swing in lateral force, and thus, air pressure. Even more, because the effect can be DC biased to a strong degree, this bipolar swing can be placed in an area of the electroadhesion force 408 curve that closely approximates a linear function. This is why the force equation, while initially governed by a square law relationship, can, in certain circumstances, approximate a linear relationship, and preserve linearity in the system. Additionally, this squaring effect can be exploited to provide increasingly higher AC force given the same small signal swing in AC voltage. For example, an AC voltage swing across the air gap 508 from 0 to 10 volts will have a much smaller force swing associated with it than an AC voltage swing from 100 to 110 volts. This means that, with the same system dynamics of a given setup, a high effective DC bias voltage can simply increase the amount of force swing felt and eventually heard by the user.

Figure 6:
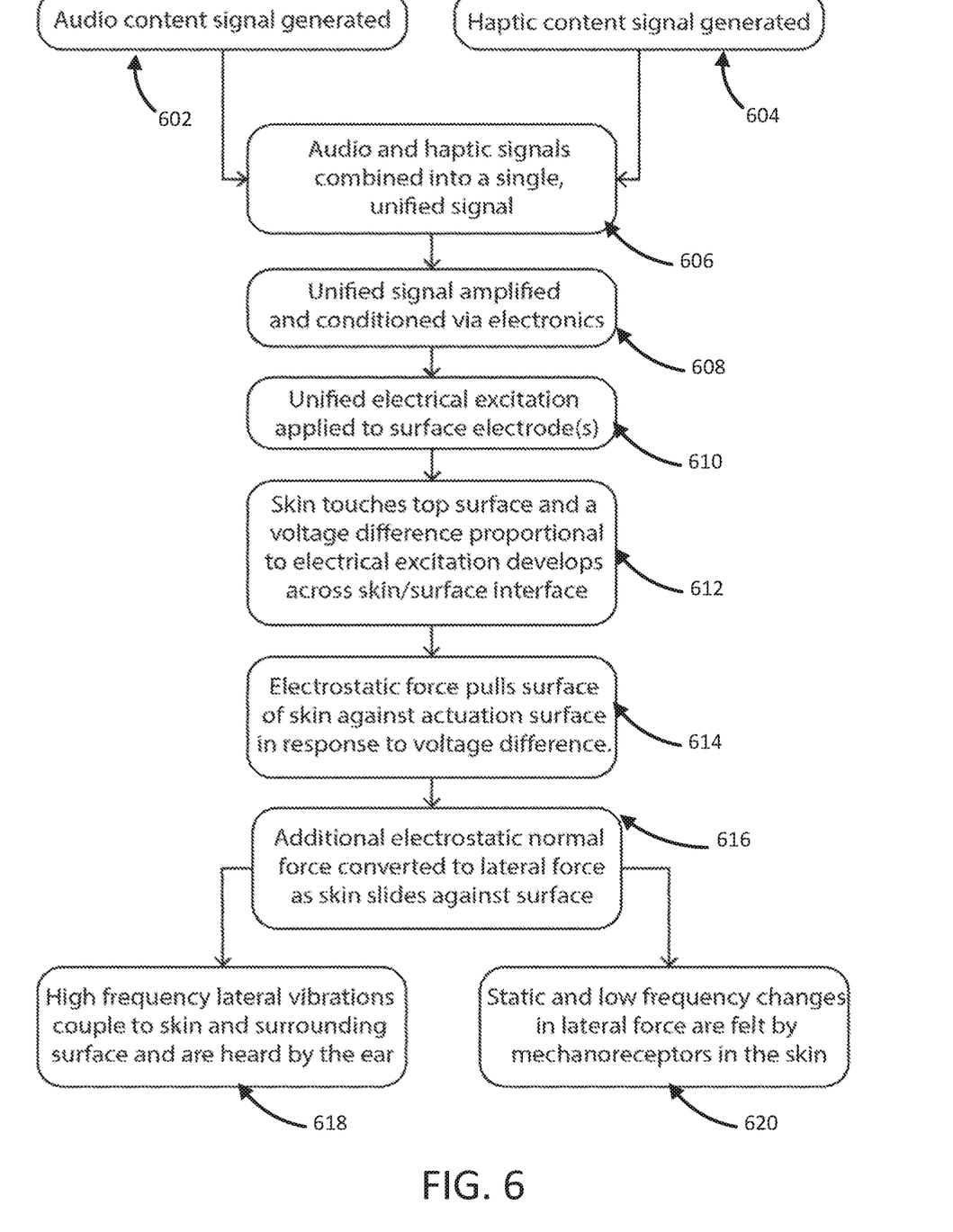
FIG. 6 depicts a schematic representation of the overall operation of the apparatus.

FIG. 6 depicts a schematic representation of the operation of the system 400. In steps 602 and 604, a haptic signal and an audio signal are generated using known methods. In step 606, the haptic signal and audio signal are combined into a unified signal using the techniques previously discussed. In step 608, the unified signal is amplified and conditioned. In step 610, the unified signal is presented to the touch surface. In step 612, skin touches top surface and a voltage difference proportional to electrical excitation develops across skin/surface interface. In step 614, the electrostatic force pulls surface of skin against actuation surface in response to voltage difference. In step 616, additional electrostatic normal force converted to lateral force as skin slides against surface. In step 618, high frequency lateral vibrations couple to skin and surrounding surface and are heard by the ear. In step 620, static and low frequency changes in lateral force are felt by mechanoreceptors in the skin.

Figure 7A:
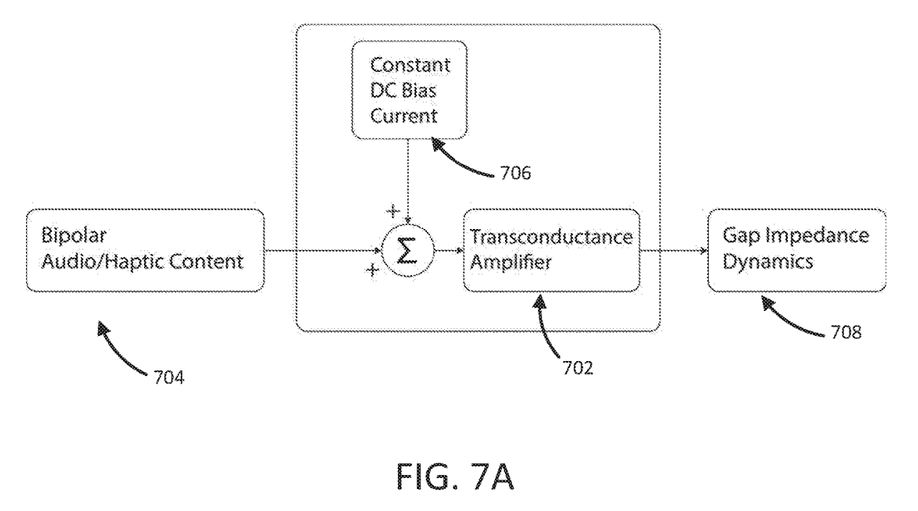
FIG. 7A depicts a schematic representation of the apparatus applying a DC force creating element to the combined audio/haptic signal, and amplifying and conditioning the signal.

FIG. 7A depicts a schematic representation of the apparatus applying a DC force creating element to the combined audio/haptic signal, and amplifying and conditioning the signal. A transconductance amplifier 702 is configured to convert a voltage signal into a controlled current signal $i_r(t)$, according to a certain gain factor, $g_m$. In addition to converting the signal to a current signal, the amplifier 702 can also apply a DC offset current to the signal. The mathematical equation associated with this step of the process is:

$$i_r(t)=g_m(f(t))+i_{max}/2$$

Where f(t) is the combined audio/haptic content, $i_{max}$ is on the order of 200 uA. This is because the perceptual limit for cutaneous current is typically around 1 mA, and it is desirable that the current itself not by sensed cutaneously by the user. The transconductance gain, $g_m$, is adjusted such that the full scale current output is 0 to $i_{max}$, that is, there is no signal clipping. Consistent with this embodiment, a haptic signal and an audio voltage signal 704 are combined into a bipolar haptic/audio signal. After the signals are combined, a DC Offset 706 is applied to the combined signal 704 before the signal 704 is converted by the transconductance amplifier 702. After the signals are combined, offset and converted, the signal is transmitted to a gap impedance dynamic unit 708 for further processing.

Figure 7B:
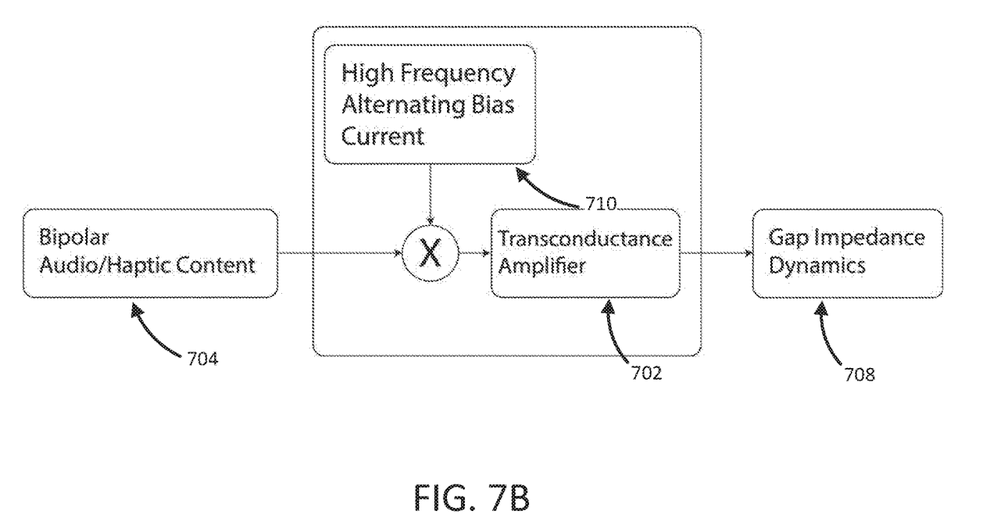
FIG. 7B depicts another embodiment of a schematic representation of the apparatus applying a DC force creating element to the combined audio/haptic signal, and amplifying and conditioning the signal.

FIG. 7B depicts another embodiment of a schematic representation of the apparatus applying a DC force creating element to the combined audio/haptic signal, and amplifying and conditioning the signal. The constant DC offset current can be replaced by a high frequency sinusoidal or square wave current 710 which, when transduced by the electroadhesive force, will be rectified and result in a DC bias force. In this embodiment, the high frequency sinusoidal current 710 can instead be multiplied by the combined audio/haptic content. The mathematical equation associated with this step is:

$$i_r(t)=g_m(f(t)*\sin(\omega_c*t))$$

where f(t) is the combined audio/haptic content, $i_r(t)$ is the output current, $g_m$ is the transconductance gain, and $w_c$ is the frequency of the high frequency sinusoidal bias.

Figure 8A:
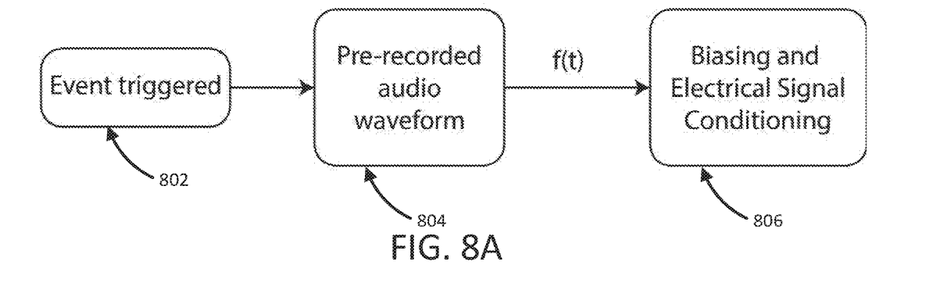
FIG. 8A depicts a schematic representation of a first method of creating combined audio/haptic content.

FIG. 8A depicts a schematic representation of a first method of creating combined audio/haptic content. In step 802, an event on the device is triggered. In step 804, a pre-recorded audio waveform is retrieved from memory. In step 806, the prerecorded audio waveform is biased and electrically conditioned. In the most basic case, the selfsame signal that is being felt by the finger 100 can simultaneously be heard by the ears. As an illustrative example, a pre-recorded song played back in time through the present invention will allow the user to hear the song emanating from their finger 100, and it will allow them to literally feel the low frequency bass of the song through vibrations of their fingertip.

Figure 8B:
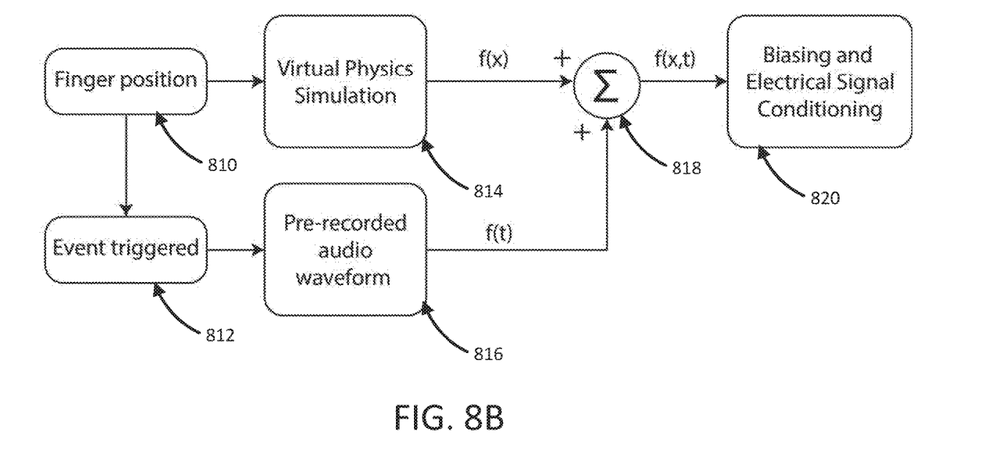
FIG. 8B depicts a schematic representation of a second method of creating combined audio/haptic content.

FIG. 8B depicts a schematic representation of a second method of creating combined audio/haptic content. The present device also lends itself to being combined with touch sensing, so that different signals can be sent to the device according to the user's finger position, velocity, acceleration, and further derivatives of position. In step 810, a finger position is detected which triggers an event in step 812. In step 814, the finger position can be fed into a virtual physics simulation that outputs a resistance force proportional to the user's finger position. Simultaneously, in step 816, a pre-recorded audio waveform is retrieved from memory based on the finger position. In step 818, the pre-recorded audio waveform and resistive force wavefrom are combined. In step 820, the combined waveform is biased and electrically conditioned.

As an illustrative example, a flat surface may be utilized as a virtual light switch. When first trying to move the switch, the user's finger position can be fed into a virtual physics simulation that outputs a resistance force proportional to the user's finger position. As the user continues to move the finger, at some point the switch will flip, triggering a separate time based event. The user will then feel a decreased resistance force according to the physics simulation and hear a pre-recorded audible click coming from the surface. These two events can be perfectly synchronized and localized, as one combined actuation signal contains all of the interaction information.

Figure 8C:
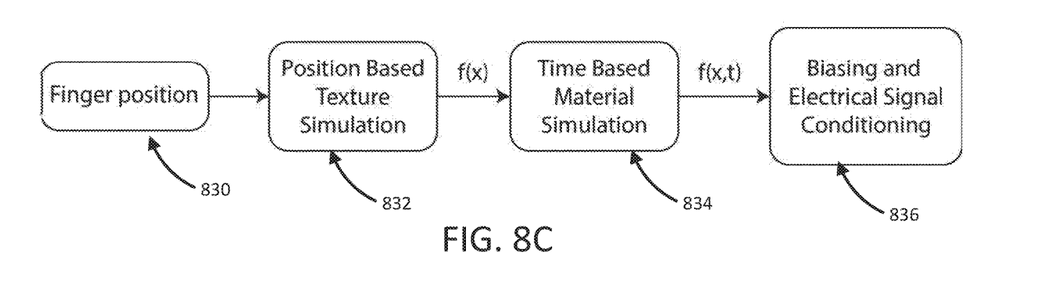
FIG. 8C depicts a schematic representation of a third method of creating combined audio/haptic content.

FIG. 8C depicts a schematic representation of a third method of creating combined audio/haptic content. In another embodiment, the device may perform the playback of virtual texture and simulation of virtual material surfaces. In step 830, a position of a finger on a touch surface is determined. In step 832, a texture simulator generates a texture signal based on the finger position. In step 834, a material simulator generates an audio signal based on the texture signal and the two signals are combined. In step 836, the combined texture and audio signal is biased and conditioned.

While we typically think of surface texture being a primarily tactile experience, there are entire classes of texture sensations that have strong audio components associated with them. Fine sandpaper, different types of writing paper, different kinds of wood, metals, etc., all have distinctive audio qualities associated with them as well as tactile textures. With the present device, these material properties could be conveyed back to the user in a rich and informative manner. Ideas such as density, heaviness, and resonant or reverberant properties of the material could be programmed into the interaction, making the user think the surface the user is touching is a much different material than the material of the actual surface being touched. As an illustrative example, the user's finger position could be fed into a virtual texture simulation that depends only on finger position. After this, the signal could be fed into a virtual material simulation that imparts separate time-based acoustic properties to the signal, resulting in a combined signal depending on both position and time in series.

It will be appreciated that touch interface devices and methods of constructing touch interface devices in accordance with the present disclosure may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such touch interface devices without departing from the scope or spirit of the claimed subject matter, and that the claims are not limited to the preferred embodiments illustrated herein. It also will be appreciated that the example embodiments are shown in simplified form, so as to focus on particular features and to avoid including structures that are not necessary to the disclosure and that would over complicate the drawings.

The invention claimed is:

1. a touch interface device that produces tactile and audio output comprising:
   a touch surface;
   a first electrode coupled to the touch surface that receives a first haptic/audio output potential;
   a second electrode coupled to a low impedance return path to the device;
   the first and second electrodes being configured such that when both the first and
   second electrodes are touched by an appendage of a user, a current flows between the first and second electrodes and the appendage;
   wherein the current creates an electric field that imparts a controlled electrostatic force at an interface of the first electrode and the appendage;
   wherein the controlled electrostatic force modulated a friction between the touch surface and the appendage;
   wherein, when the appendage is moved across the touch surface, the controlled electrostatic force and its modulation of friction causes a skin of the appendage to vibrate, wherein the vibration of the skin is tactilely perceptible to the user; and
   wherein the vibration of the skin causes a vibration in the surrounding air that is audible to the user, and that is based on the first haptic/audio output potential.

2. The touch interface device of claim 1, wherein at least one of the first and second electrodes is coated by an electrically semi-conductive layer or insulating layer.

3. The touch interface device of claim 1, wherein the first and second electrodes are coated by an electrically semi-conductive layer or insulating layer.

4. The touch interface device of claim 1, wherein a controlling potential is applied to the first electrode, and the second electrode is held at a constant potential or ground potential.

5. The touch interface device of claim 1, wherein a controlling potential is applied to the first electrode, and a different controlling potential is applied to the second electrode.

6. The touch interface device of claim 1, wherein a controlling potential is applied to the first electrode, and the second electrode is provided by the body's capacitive coupling to the return path.

7. The touch interface device of claim 1, wherein the first and second electrodes are attached to an acoustically resonant surface.

8. The touch interface device of claim 1, including an air gap between the appendage and the touch surface.

9. The touch interface device of claim 8, wherein the amount of force applied to the appendage is related to the voltage across the air gap.

10. The touch interface device of claim 1 wherein the first haptic/audio signal and second haptic audio signals are bipolar controlling signals.

11. The touch interface device of claim 1, wherein the potential difference between the first electrodes and second electrodes is at frequencies ranging from 0 Hz to 20 kHz or more.

12. A method for controlling a unified tactile and audio output from a touch interface device comprising:
    combining both a haptic and an audio content into a single bipolar controlling signal;
    applying a DC bias to the combined signal; and
    feeding the combined signal to one or more electrodes coupled to a touch surface of the touch interface device, wherein the combined signal modulates a friction between a surface of the touch interface device and an appendage of a user which causes a skin of the appendage to vibrate as the appendage is moved across the surface, wherein the vibration of the skin is tactilely perceptible to the user, and wherein the vibration of the skin causes a vibration in the surrounding air that is audible to the user, and that is based on the audio content.

13. The method of claim 12, further comprising controlling an output potential difference of the electrodes according to the combined signal.

14. The method of claim 12, further comprising monitoring current flowing between the electrodes and controlling an output potential difference of the electrodes according to the current flow.

15. The method of claim 14, including controlling the current flow according to the combined signal.

16. The method of claim 12, further comprising controlling the potential difference between the electrodes at frequencies ranging from 0 Hz to 20 kHz or more.

17. The method of claim 12, including creating an additional normal force by energizing the edges of an air gap formed by the touch surface and an appendage engaging the touch surface.

18. The method of claim 12, wherein movement of an appendage coupled to the touch surface generates a plurality of high frequency lateral vibrations that generate an audible sound.

19. The method of claim 12, wherein a DC offset is applied to the combined haptic and audio signal.

20. The method of claim 12, wherein static and low frequency changes in the combined signal generate a haptic effect.

21. The method of claim 12 wherein the combined signal is amplified and conditioned.

22. The method of claim 12 wherein the DC bias is applied by adding a constant to the combined haptic and audio signal.

23. The method of claim 12 wherein the DC bias is applied by multiplying the combined haptic and audio signal by a high frequency sinusoidal carrier.

24. A touch interface device that produces tactile and audio output comprising:
    a touch surface;
    a first electrode coupled to the touch surface that receives a first haptic/audio output potential;
    a second electrode coupled to a low impedance return path to the device;
    the first and second electrodes being configured such that when both the first and second electrodes are touched by an appendage of a user, a current flows between the first and second electrodes and the appendage;
    wherein the current creates an electric field that imparts a controlled electrostatic force at an interface of the first electrode and the appendage, wherein the controlled electrostatic force modulates a friction between the touch surface and the appendage; and
    wherein when the appendage slides long the touch surface, the modulation of friction causes a skin of the appendage to vibrate, wherein the vibration of the skin is tactilely perceptible to the user; and
    wherein the vibration of the skin causes a vibration in the surrounding air that is audible to the user, and that is based on the first haptic/audio output potential.

* * * * *